United States Patent
Sato

(10) Patent No.: US 7,036,306 B2
(45) Date of Patent: May 2, 2006

(54) ONE-WAY CLUTCH

(75) Inventor: Naoto Sato, Shizuoka (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 0 days.

(21) Appl. No.: 10/449,683

(22) Filed: Jun. 2, 2003

(65) Prior Publication Data

US 2004/0139743 A1 Jul. 22, 2004

(30) Foreign Application Priority Data

Jun. 3, 2002 (JP) ............................. 2002-161331
May 23, 2003 (JP) ............................. 2003-146264

(51) Int. Cl.
*F16D 33/00* (2006.01)

(52) U.S. Cl. ............................................ 60/345; 192/45
(58) Field of Classification Search ................ 60/345; 192/45, 3.3

See application file for complete search history.

(56) References Cited

U.S. PATENT DOCUMENTS 2,762,197 A * 9/1956 Ullery ........................... 60/345
3,361,237 A * 1/1968 Mathews ..................... 192/45
5,125,487 A * 6/1992 Hodge ....................... 192/3.34
5,586,434 A * 12/1996 Okubo et al. ................. 60/345
5,598,909 A * 2/1997 Papania ....................... 192/45
6,092,634 A * 7/2000 Kremer et al. ............... 192/38
6,125,980 A * 10/2000 Ruth et al. .................... 192/46
6,155,392 A * 12/2000 Kundermann ............... 192/3.3
6,467,596 B1 * 10/2002 Lay ............................. 192/45
6,612,107 B1 * 9/2003 Sato ............................. 60/345
6,619,036 B1 * 9/2003 Kawamoto et al. ........... 60/345

FOREIGN PATENT DOCUMENTS

JP          8-82359          3/1996

* cited by examiner

Primary Examiner—Edward K. Look
Assistant Examiner—Michael Leslie
(74) Attorney, Agent, or Firm—Arent Fox PLLC

(57) ABSTRACT

A one-way clutch includes an inner race 16; an outer race 15 surrounding the inner race 16; a plurality of rollers 20 inserted between an outer peripheral surface of the inner race 16 and a plurality of wedge faces 18a formed on the outer race 15 so that they are opposed to the outer peripheral surface of the inner race 16; and springs 19 for biasing the rollers 20 in directions to bite into the wedge faces 18a. In the one-way clutch, the outer race 15 comprises an outer race body 17 made of a light alloy and surrounding the inner race 16, and roller-receiving members 18 which have the wedge faces 18a and which are disposed on bottoms of a plurality of recesses 28 in the inner race body 17 and harder than the outer race body 17. Thus, it is possible to achieve a reduction in weight of the outer race, while ensuring the durability of a contact face of the outer race with the rollers.

15 Claims, 15 Drawing Sheets

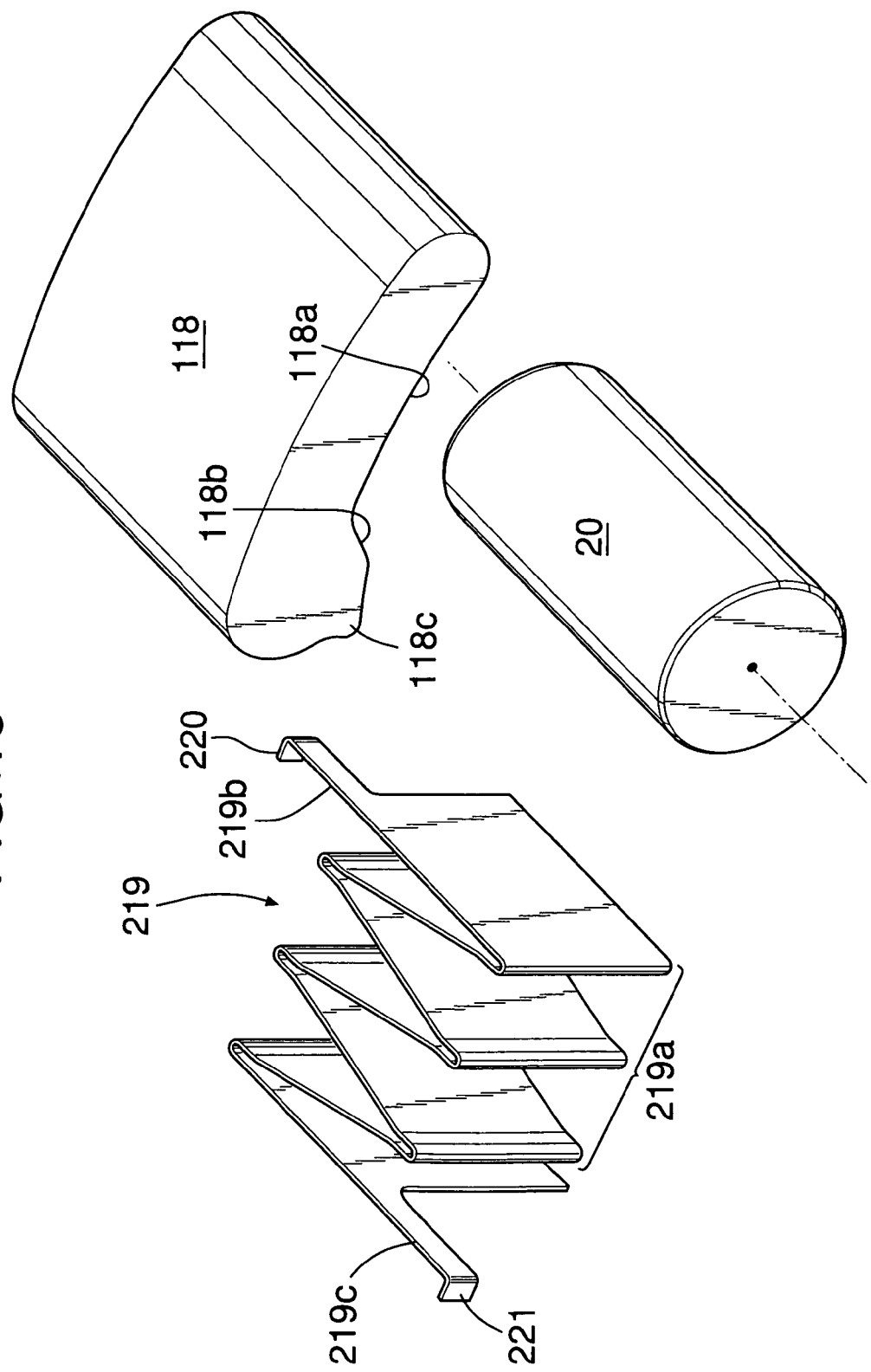

ONE-WAY CLUTCH

BACKGROUND OF THE INVENTION

1. Field of the Invention

The present invention relates to a one-way clutch used in a torque converter or the like, and particularly to an improvement in a one-way clutch comprising an inner race, an outer race coaxially surrounding the inner race, a plurality of rollers inserted between an outer peripheral surface of the inner race and a plurality of wedge faces formed on the outer race so that they are opposed to the outer peripheral surface of the inner race, and springs for biasing the rollers in directions to bite into the corresponding wedge faces.

2. Description of the Related Art

Such a one-way clutch is already known, for example, as disclosed in Japanese Patent Application Laid-open No. 8-82359.

In the conventional one-way clutch, each of the inner and outer races is made of a steel from the need of providing a durability to each of the outer peripheral surface of the inner race and the wedge faces of the outer race contacting the rollers. However, if the largest-diameter outer race in the one-way clutch is made of the steel, the weight of the one-way clutch is obliged to be increased.

SUMMARY OF THE INVENTION

The present invention has been achieved with the above-mentioned circumstances in view, and it is an object of the present invention to provide a one-way clutch, wherein the weight of the outer race can be reduced, while ensuring a durability of faces of the outer race contacting the rollers.

To achieve the above object, according to a first feature of the present invention, there is provided a one-way clutch comprising: an inner race; an outer race coaxially surrounding the inner race; a plurality of rollers inserted between an outer peripheral surface of the inner race and a plurality of wedge faces formed on the outer race so that they are opposed to the outer peripheral surface of the inner race; and springs for biasing the rollers in directions to bite into the corresponding wedge faces, characterized in that the outer race comprises an outer race body surrounding the inner race, and roller-receiving members which have the wedge faces and which are disposed on bottoms of a plurality of recesses formed in an inner periphery of the inner race body and harder than the outer race body.

With the first feature, the durability of the wedge faces contacting the rollers can be ensured by employing the hard roller-receiving members having the wedge faces. Moreover, the largest-diameter outer race body in the one-way clutch, which supports the roller-receiving members, can be formed of a light material such as a light alloy, whereby a great reduction in weight can be achieved to contribute to a reduction in weight of the one-way clutch.

According to a second feature of the present invention, in addition to the first feature, a bearing face for supporting the inner race for rotation is formed on the inner periphery of the outer race body between the adjacent recesses.

With the second feature, the accuracy of concentricity between the inner race and the outer race can be improved by a remarkably simple structure in which the outer peripheral surface of the inner race is carried on the bearing faces, to stabilize the clutching action of the rollers with respect to the wedge faces.

According to a third feature of the present invention, in addition to the first or second feature, each of the wedge faces of the roller-receiving members is formed as a concave curved face.

With the third feature, the pressure of contact between the wedge face and the roller can be minimized, whereby the durability of their contact portions can be improved.

According to a fourth feature of the present invention, in addition to any of the first to third features, each of the roller-receiving members is formed so that its cross-sectional shape is symmetric with respect to two axes perpendicular to each other.

With the fourth feature, even if the roller-receiving member is disposed in whatever manner on the bottom of each of the recesses, the wedge face can be appropriately opposed to the roller, and hence there is not a fear of erroneous assembling, leading to an improvement in assemblability.

According to a fifth feature of the present invention, in addition to any of the first to fourth features, each of the springs is comprised of a leaf spring clamped between the bottom of each of the recesses and each of the roller-receiving member, the leaf spring being provided with a free end for biasing the roller in a direction to bite into the wedge face.

With the fifth feature, the roller-receiving member also serves as a support member for supporting the leaf spring, whereby a special support member for supporting the leaf spring is eliminated, so that the structure can be simplified. Moreover, in the assembling, the leaf spring is merely fitted into the recess together with the roller-receiving member, resulting in a good attachability of the leaf spring.

According to a sixth feature of the present invention, in addition to any of the first to fifth features, the inner race is coupled to a stator shaft of a torque converter, and the outer race body made of a light alloy is formed integrally on a stator hub made of a light alloy in the torque converter.

With the sixth feature, the outer race body made of the light alloy can be formed integrally with a stator impeller made of a light alloy, leading to a reduction in weight of the stator impeller and reductions in the number of parts and the number of assembling steps.

According to a seventh feature of the present invention, in addition to any of the first to sixth features, each of the recesses is formed to open to axially opposite end faces of the outer race body, and transverse widths of the roller-receiving member and the roller are set to be substantially equal to a transverse width of the recess.

With the seventh feature, the transverse widths of the roller-receiving member and the roller in the one-way clutch can be maximized, whereby the pressure of contact between them can be minimized, leading to a further improvement in durability of their contact portions.

According to an eighth feature of the present invention, in addition to the sixth feature, each of the roller-receiving members has a stopper face adapted to receive the roller when the roller is moved to climb on the wedge face in a direction away from the outer peripheral surface of the inner race by a centrifugal force.

With the eighth feature, in a coupling state of the torque converter, the roller is supported on the stopper face by the centrifugal force, whereby the unnecessary contact between the roller and the outer peripheral surface of the inner race can be avoided, leading to an improvement in durability.

According to a ninth feature of the present invention, in addition to the first feature, the spring is comprised of a zigzag-shaped leaf spring portion, a first abutment end connected to one end of the leaf spring portion to abut against a spring-supporting face of an inner wall of the recess, and a second abutment end connected to the other end of the leaf spring portion to abut against the roller, and the roller is biased in a direction to bite into the wedge face by a resilient force of the leaf spring portion.

With the ninth feature, the roller can be stably urged by the single spring in the direction to bite into the wedge face.

According to a tenth feature of the present invention, in addition to the ninth feature, the second abutment end is formed to abut against the roller over its axial substantially entire width.

With the tenth feature, the inclination of the roller can be prevented reliably by the abutment of the second abutment end of the spring against roller over its axial substantially entire width, to ensure the good clutching action.

The above and other objects, features and advantages of the invention will become apparent from the following description of the preferred embodiments taken in conjunction with the accompanying drawings.

BRIEF DESCRIPTION OF THE DRAWINGS

FIG. 15 is an exploded perspective view of an essential portion of a third embodiment of the present invention.

DESCRIPTION OF THE PREFERRED EMBODIMENTS

The present invention will now be described by way of preferred embodiments with reference to the accompanying drawings.

The description of a first embodiment of the present invention shown in FIGS. 1 to 7 is first started.

Figure 1:
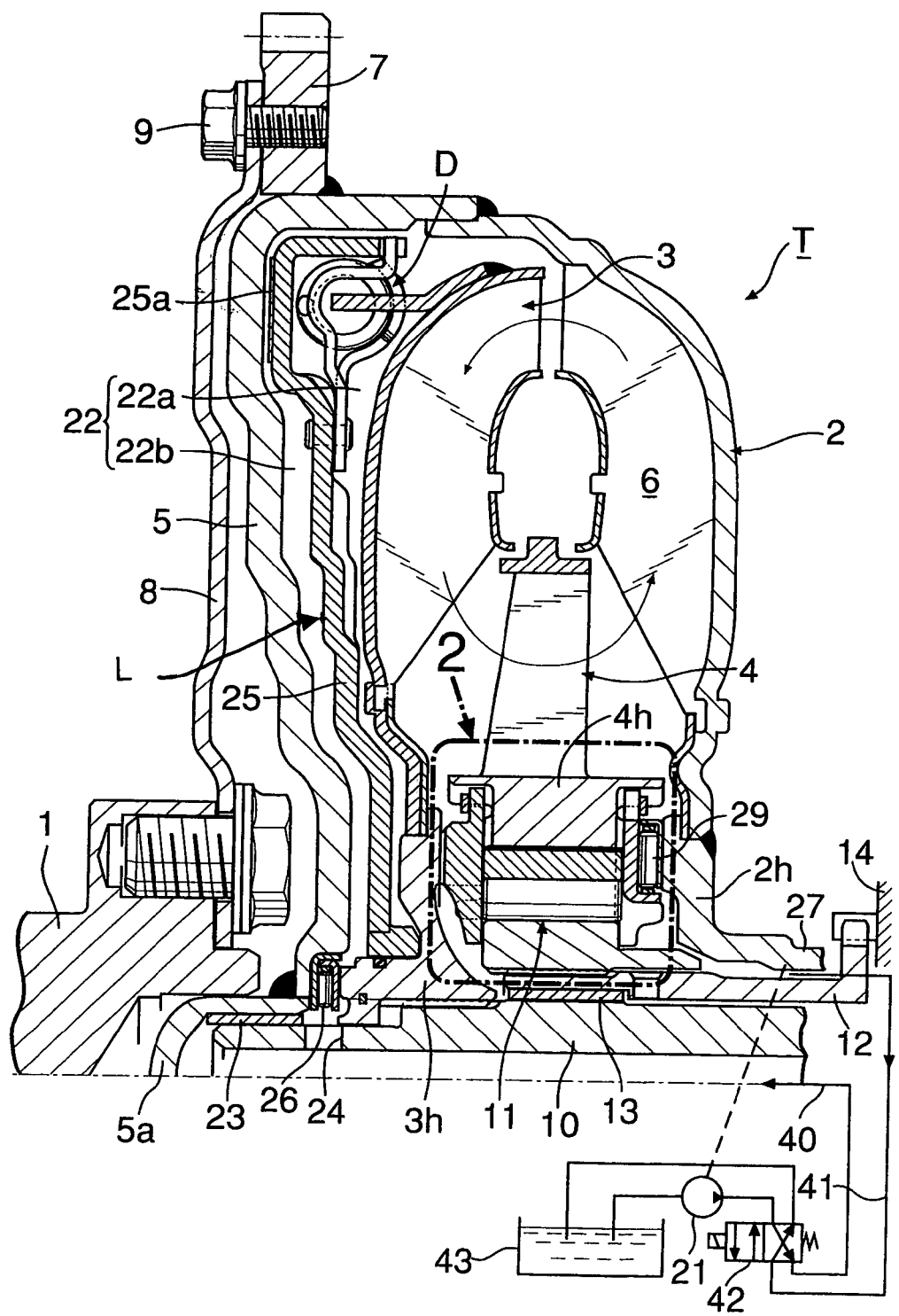
FIG. 1 is a vertical sectional side view of a torque converter including a one-way clutch according to a first embodiment of the present invention.

Referring to FIG. 1, a torque converter T includes a pump impeller 2, a turbine impeller 3 opposed to the pump impeller 2, and a stator impeller 4 disposed between inner peripheries of the pump impeller 2 and the turbine impeller 3. A circulation circuit 6 for transmitting power by a working oil is defined between the impellers 2, 3 and 4.

A side cover 5 for covering an outer side of the turbine impeller 3 is integrally connected by welding to the pump impeller 2. A starting ring gear 7 is fitted over and welded to an outer peripheral surface of the side cover 5. A driving plate 8 coupled to a crankshaft 1 is secured to the ring gear 7 by a bolt 9. A thrust bearing 26 is interposed between a turbine hub 3h of the turbine impeller 3 and the side cover 5.

An output shaft 10 is disposed at a central portion of the torque converter T and arranged coaxially with the crankshaft 1. The output shaft 10 is spline-fitted to the turbine hub 3h and rotatably carried on a support tube 5a at a central portion of the side cover 5 with a bearing bush 23 interposed therebetween. The output shaft 10 is a main shaft of a multi-stage transmission which is not illustrated.

A hollow cylindrical stator shaft 12 is disposed around an outer periphery of the output shaft 10 to support the stator hub 4h of the stator impeller 4 through a one-way clutch 11 according to the present invention. A bearing bush 13 is interposed between the output shaft 10 and the stator shaft 12 to permit the relative rotations between the output shaft 10 and the stator shaft 12. The stator shaft 12 is non-rotatably supported at its outer end on a transmission case 14.

The one-way clutch 11 will be described in detail below with reference to FIGS. 2 to 7.

Figure 2:
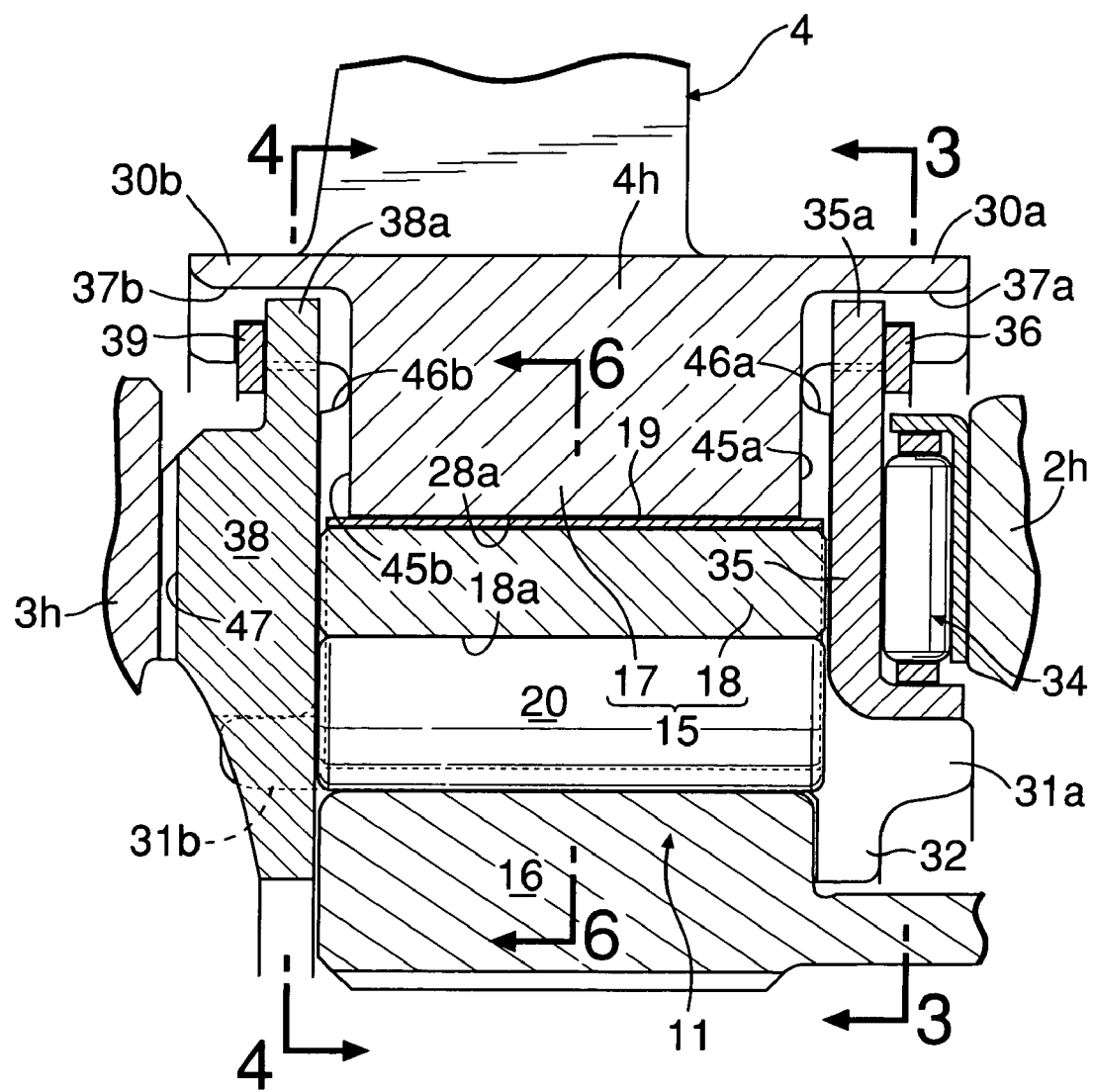
FIG. 2 is an enlarged view of a portion 2 shown in FIG. 1.
Figure 3:
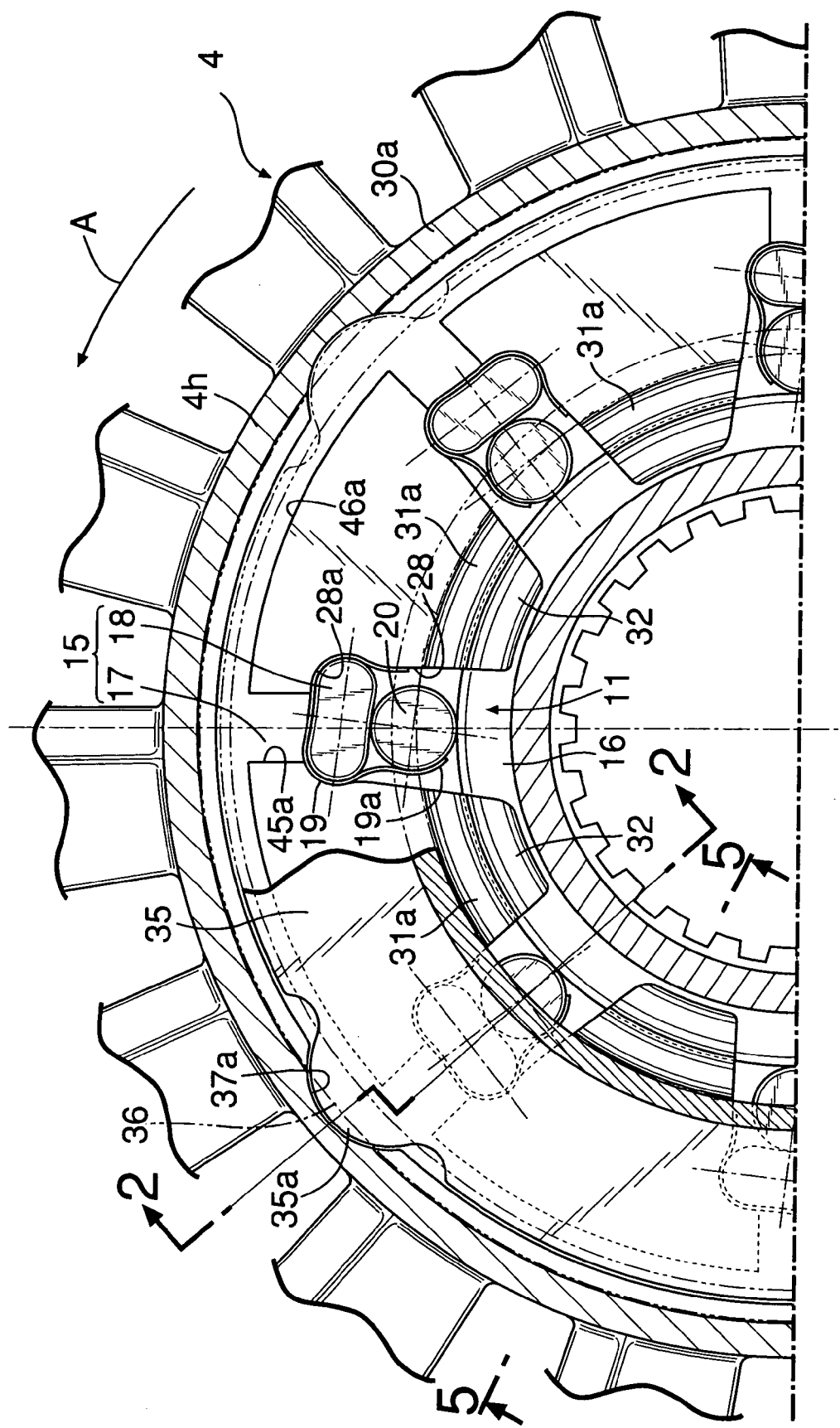
FIG. 3 is a sectional view taken along a line 3—3 in FIG. 2.
Figure 4:
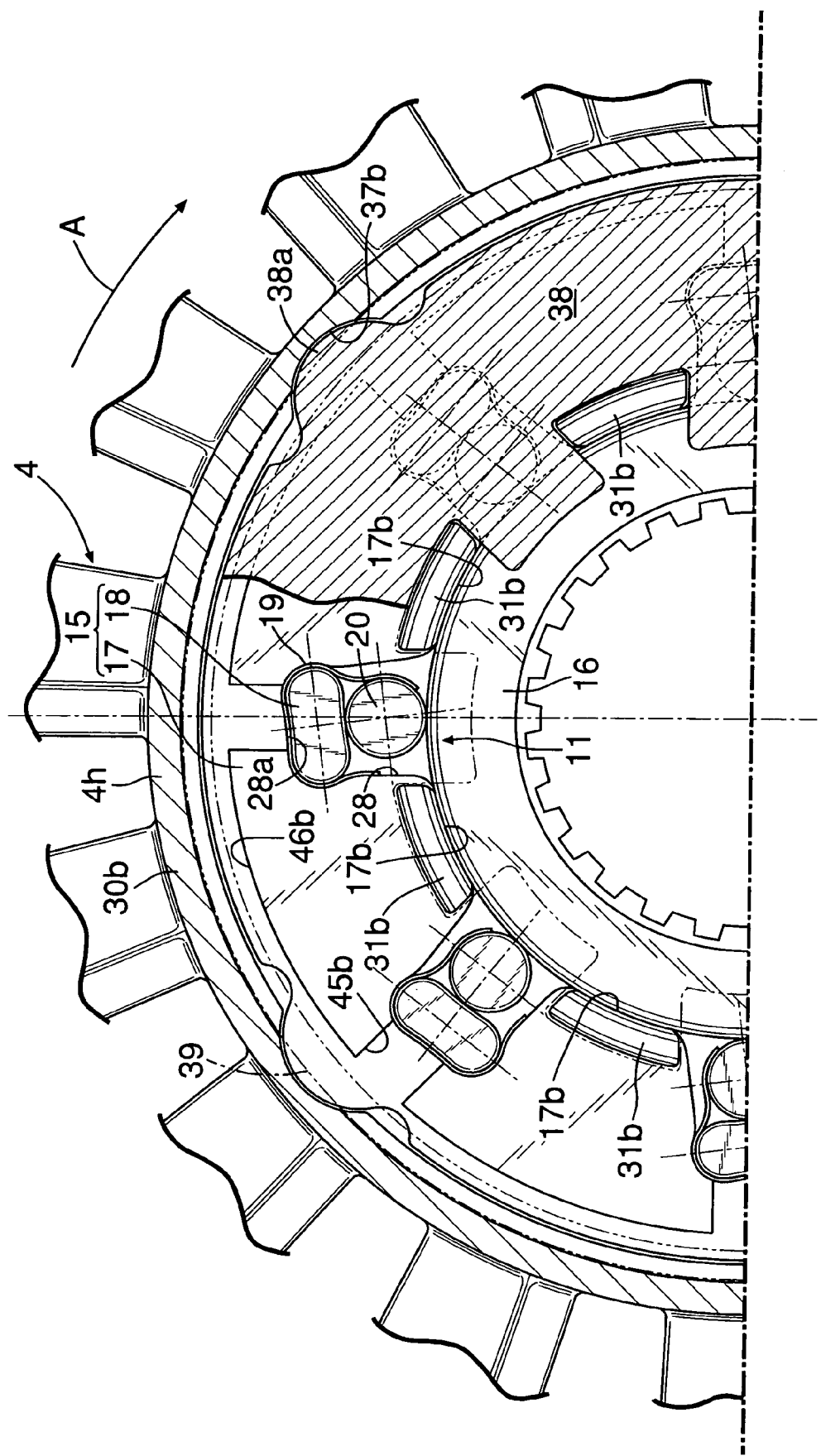
FIG. 4 is a sectional view taken along a line 4—4 in FIG. 2.
Figure 5:
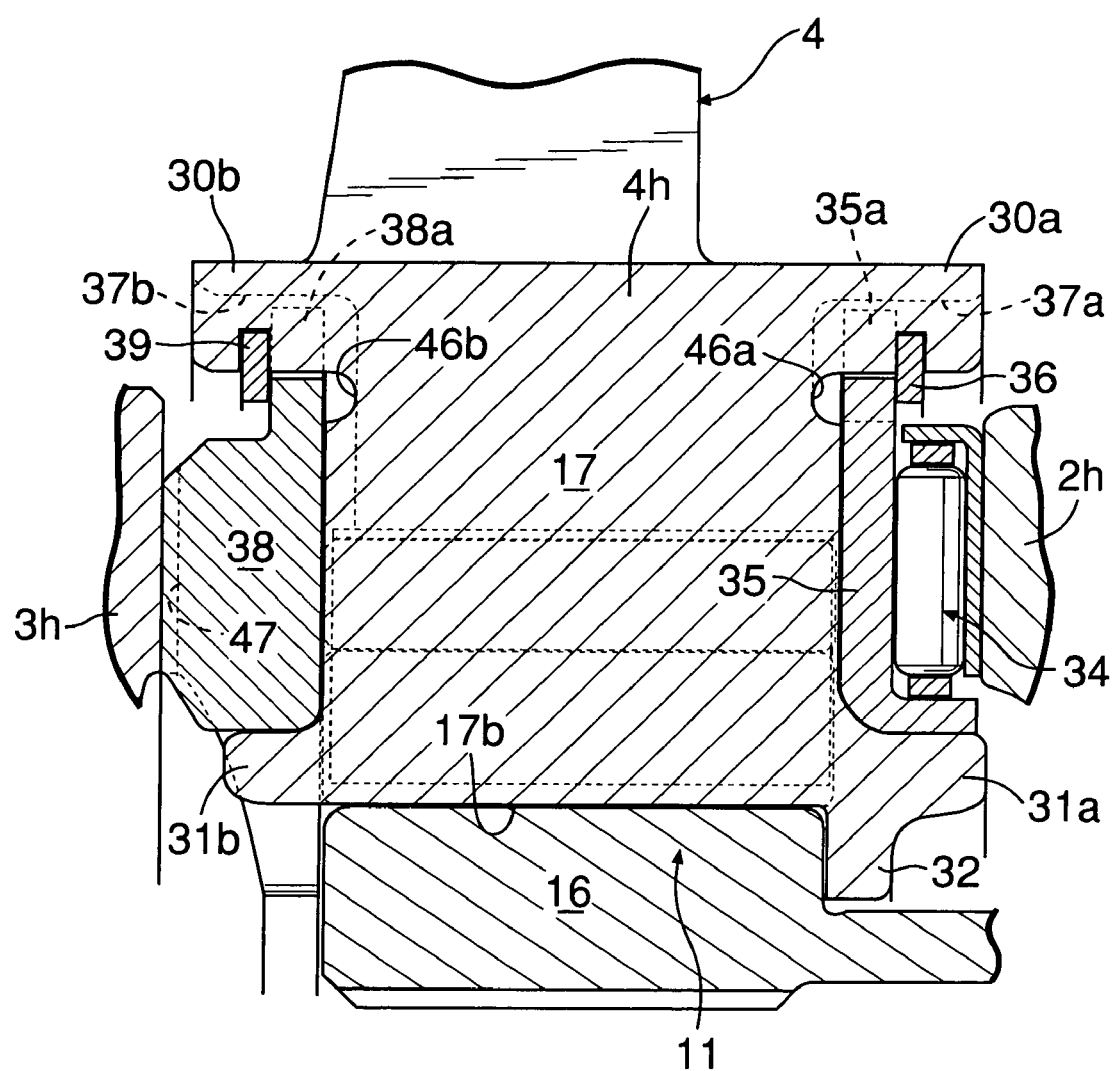
FIG. 5 is a sectional view taken along a line 5—5 in FIG. 3.
Figure 6:
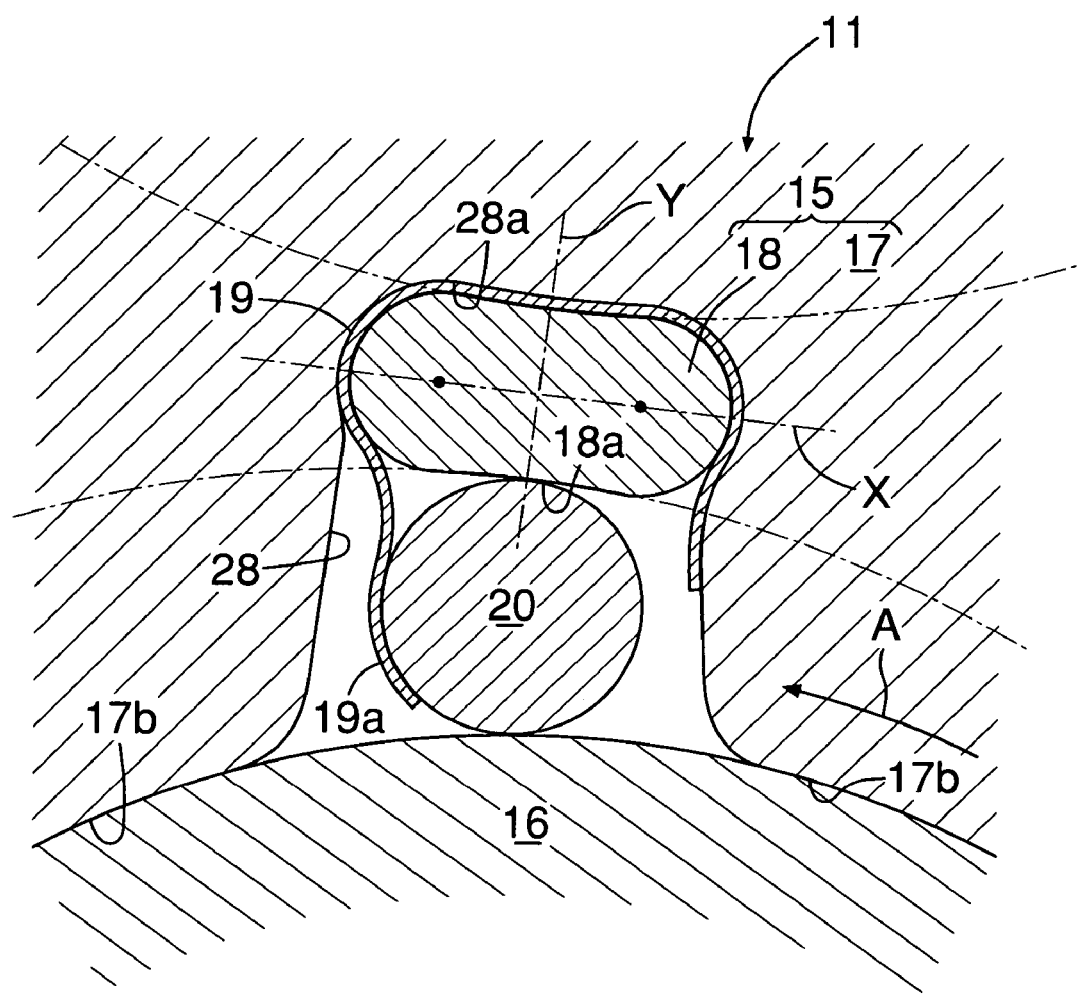
FIG. 6 is a sectional view taken along a line 6—6 in FIG. 2.
Figure 7:
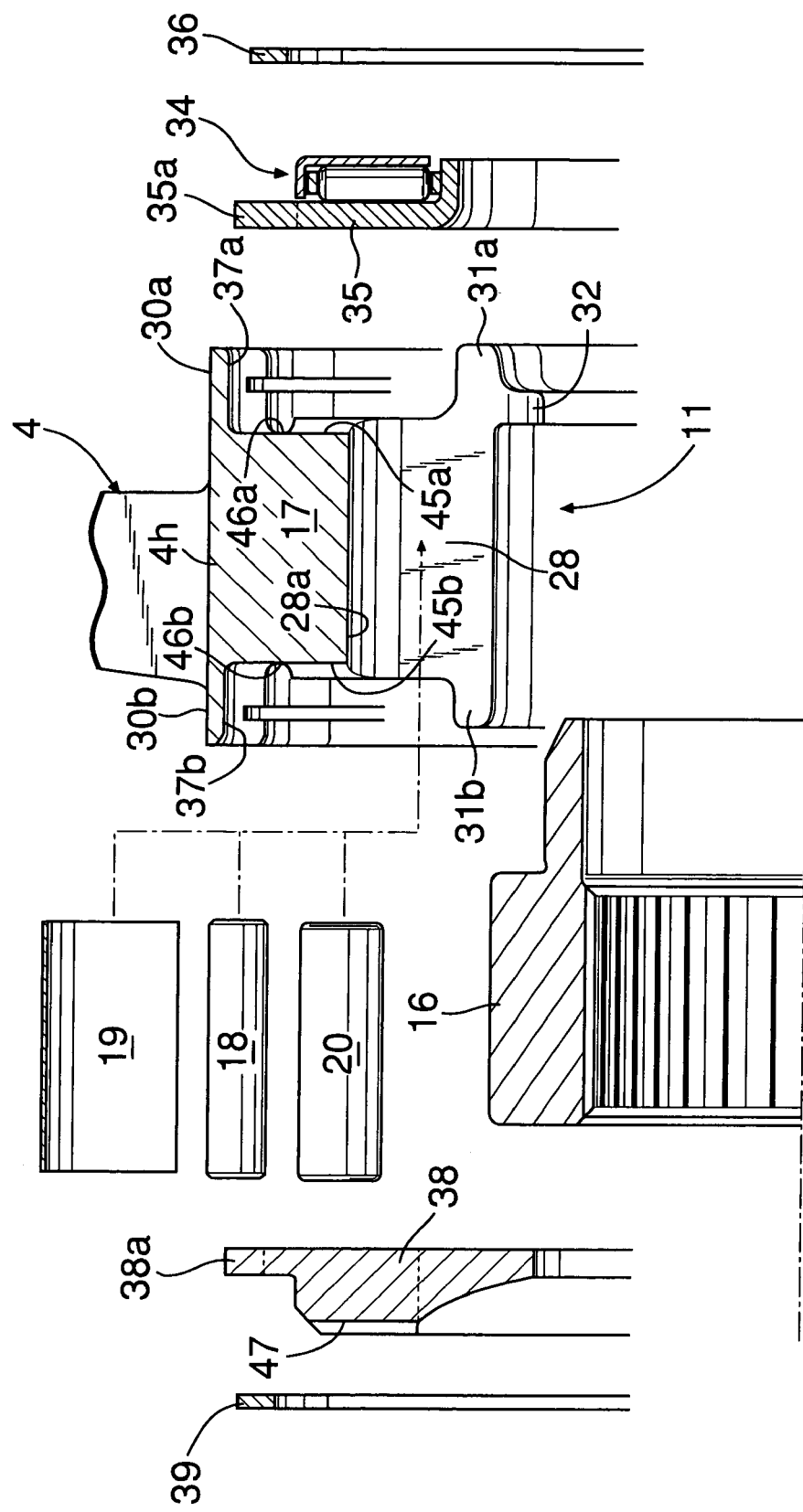
FIG. 7 is an exploded view of the one-way clutch shown in FIG. 2.
Figure 8:
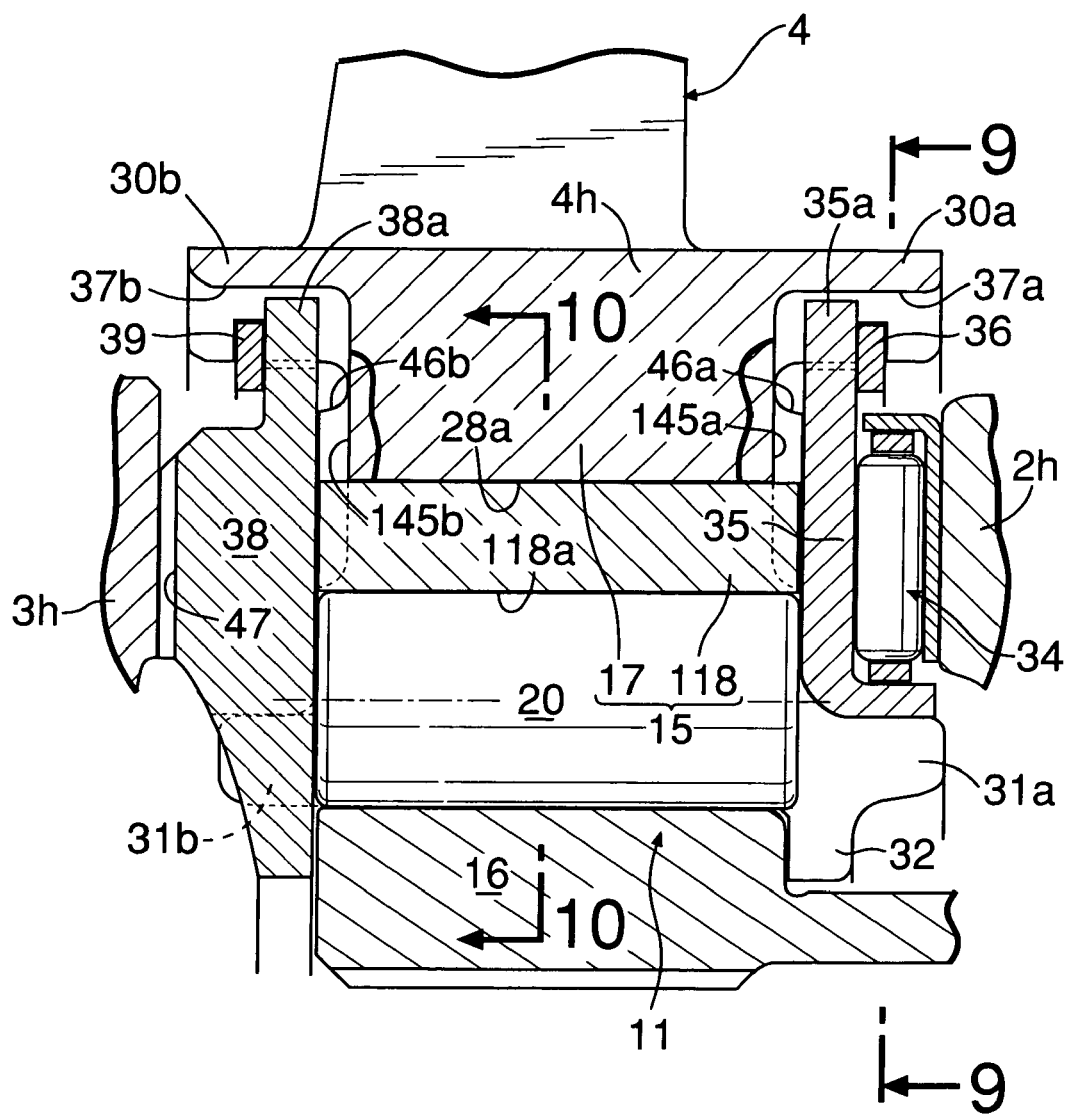
FIG. 8 is a view similar to FIG. 2, but showing a second embodiment of the present invention (a sectional view taken along a line 8—8 in FIG. 9).
Figure 9:
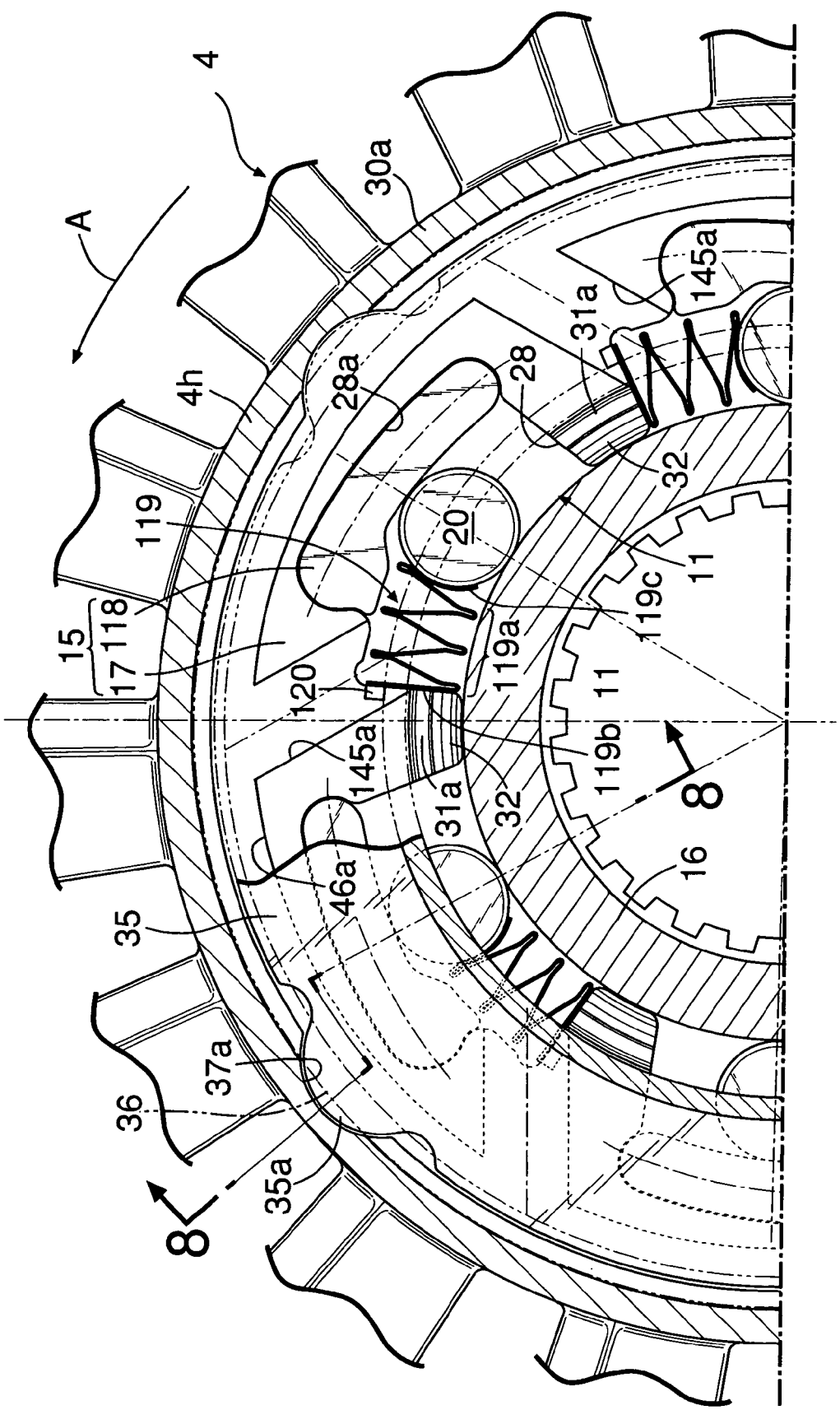
FIG. 9 is a sectional view taken along a line 9—9 in FIG. 8.

As shown in FIGS. 2, 6 and 7, the one-way clutch 11 includes an outer race body 17 integrally formed by casting on an inner periphery of the stator hub 4h along with the stator hub 4h using a light alloy such as an aluminum alloy as a material, and an inner race 16 spline-coupled to an outer periphery of the stator shaft 12 and coaxially disposed within the outer race body 17.

A plurality of recesses 28 are formed at equal distances in an inner peripheral surface of the outer race body 17 and open into axially opposite end faces of the outer race body 17. A bottom of each of the recesses 28 is a roller-receiving member-fitted portion 28a. A plurality of roller-receiving members 18 are fitted axially to the bottoms 28a of the recesses 28 with thin leaf springs 19 interposed therebetween. A plurality of roller 20 are inserted between the roller-receiving members 18 and an outer peripheral surface of the inner race 16, respectively. Transverse widths, i.e., axial lengths of the roller-receiving members 18 and the rollers 20 are set to be substantially equal to a transverse width of the recesses 28.

The roller-receiving member 18 has a cross-sectional shape which is a cocoon-shape symmetric with respect two axes X and Y perpendicular to each other. When the roller-receiving member 18 is fitted to the roller-receiving-member fitted portion 28a of the corresponding recess 28, a concave curved surface 18a of the cocoon-shape opposed to the outer peripheral surface of the inner race 16 becomes a wedge face which cooperates with the outer peripheral surface of the inner race 16. Namely, the roller-receiving member 18 is disposed at such an attitude that the distance between its wedge face 18a and the outer peripheral surface of the inner race 16 is decreased in a given circumferential direction. An outer race 15 is constituted by the outer race body 17 and the roller-receiving members 18.

Thus, when the outer race 15 is rotated in a direction A to pull the roller 20 to a side where the distance between the outer peripheral surface of the inner race 16 and the wedge face 18a is decreasing with respect to the inner race 16, the roller 20 bites into between the outer peripheral surface of the inner race 16 and the wedge face 18a, to thereby connect the races 15 and 16 to each other, so that the one-way clutch 11 is brought into a connecting state. On the other hand, the outer race 15 is rotated in an opposite direction, the roller 20 escapes to a side where the distance between the outer peripheral surface of the inner race 16 and the wedge face 18a is increasing, to thereby release the connection between the races 15 and 16, so that the one-way clutch 11 is brought into a disconnecting state.

The leaf spring 19 clamped between the bottom of the recess 28 and the roller-receiving member 18 has a free end adapted to urge one side of the roller 20, whereby the roller 20 is constantly biased in a direction to bite into between the outer peripheral surface of the inner race 16 and the wedge face 18a.

As shown in FIGS. 2 to 5, the stator 4h has a pair of cylindrical portions 30a and 30b overhanging axially outwards from opposite end faces of the outer race body 17. On the other hand, the outer race body 17 integrally has, at its end face closer to the pump impeller 2, a circumferential support wall 31a protruding axially between the adjacent recesses 28, and an axial support wall 32 protruding from an inner peripheral surface of the circumferential support wall 31a. The outer race body 17 integrally has, at its end face closer to the turbine impeller 3, a circumferential support wall 13b protruding axially between the adjacent recesses 28.

An inner thrust plate 35 of a thrust needle bearing 34 is fitted over an inner peripheral surface of the cylindrical portion 30a closer to the pump impeller 2 and an outer peripheral surface of the circumferential support wall 31a, and is retained by a stop ring 36 locked on the inner peripheral surface of the cylindrical portion 30a. The inner thrust plate 35 has a plurality of projections 35a provided on its outer periphery and engaged into a detent groove 37a in the inner peripheral surface of the cylindrical portion 30a, so that it is rotated along with the stator hub 4h. In this way, the thrust needle bearing 34 is disposed between opposed end faces of the outer race body 17 and the pump hub 2h, to inhibit the withdrawal of the roller-receiving member 18, the roller 20 and the leaf spring 19 from the recess 28 toward the pump hub 2h.

A thrust plate 38 is fitted over an inner peripheral surface of the cylindrical portion 30b closer to the turbine impeller 3 and an outer peripheral surface of the circumferential support wall 31b, and is retained by a stop ring 39 locked on the inner peripheral surface of the cylindrical portion 30b. The thrust plate 38 has a plurality of projections 38a provided on its outer periphery and engaged into a detent groove 37b in the inner peripheral surface of the cylindrical portion 30b, so that it is rotated along with the stator hub 4h. In this way, the thrust plate 38 is disposed between opposed end faces of the outer race body 17 and the turbine hub 3h, to inhibit the withdrawal of the roller-receiving member 18, the roller 20 and the leaf spring 19 from the recess 28 toward the turbine hub 3h.

The axial support wall 32 and the thrust plate 38 are disposed to axially sandwich the inner race 16 therebetween, whereby the axial position of the inner race 16 relative to the outer race body 17 is determined.

Further, the outer race body 17 has, in its axially opposite ends, radial oil grooves 45a and 45b extending radially outwards from each of the recesses 28, and annular oil grooves 46a and 46b permitting the radial oil grooves 45a and 45b to communicate with the detent grooves 37a and 37b, respectively.

Referring again to FIG. 1, an auxiliaries-driving shaft 27 coupled to the pump impeller 2 is disposed relatively rotatably over the outer periphery of the stator shaft 12, so that the oil pump 21 for supplying the working oil to the torque converter T is driven by the auxiliaries-driving shaft 27.

A clutch chamber 22 is defined between the turbine impeller 3 and the sides cover 5 to communicate at its outer periphery with the circulation circuit 6. A lockup clutch L capable of connecting the turbine impeller 3 and the side cover 5 directly to each other is mounted in the clutch chamber 22. More specifically, a clutch piston 25 is disposed in the clutch chamber 22 so that the clutch piston 25 forming a main body of the lockup clutch L divides the clutch chamber 22 into an inner chamber portion 22a closer to the turbine impeller 3 and an outer chamber portion 22b closer to the side cover 5. The clutch piston 25 is axially slidably carried on the outer peripheral surface of the turbine hub 3h so that it can be moved between a connecting position at which a friction lining 25a provided on one end face of the piston 25 is in pressure contact with the inner wall of the side cover 5 and a non-connecting position at which the friction lining 25a is spaced apart from the inner wall.

A known torque damper D is disposed in the clutch chamber 22 to connect the clutch piston 25 and the turbine impeller 3 to each other in a buffering manner.

A first oil passage 40 is provided in a central portion of the output shaft 10 to communicate with the outer chamber portion 22b of the clutch chamber 22 through a transverse bore 24 and the thrust bearing 26. A second oil passage 41 is defined between the auxiliaries-driving shaft 27 and the stator shaft 12, and communicates with an inner peripheral portion of the circulation circuit 6 through the radial oil grooves 45a and 45b, the annular oil grooves 46a and 46b and the detent grooves 37a and 37b. The first oil passage 40 and the second oil passage 41 are adapted to be connected alternately to a discharge side of the oil pump 21 and an oil reservoir 43 by a lockup control valve 42.

Next, the operation of the embodiment will be described below.

The lockup control valve 42 is controlled by an electronic control unit (not shown) so that the first oil passage 40 is connected to the discharge side of the oil pump 21, and the second oil passage 41 is concurrently connected to the oil reservoir 43, as shown in FIG. 1, in an idling operational region or an extremely low-speed operational range of the engine. Therefore, when an output torque from the crankshaft 1 of the engine is transmitted to the driving plate 8, the side cover 5 and the pump impeller 2 to drive the pump impeller 2 to rotate, and further drives the oil pump 21, the working oil discharged by the oil pump 21 flows from the lockup control valve 42 sequentially through the first oil passage 40, the transverse bore 24 and the thrust bearing 26, the outer chamber portion 22b and the inner chamber portion 22a of the clutch chamber 22, into the circulation circuit 6 to fill the circuit 6; flows through the detent grooves 37a and 37b, the annular oil grooves 46a and 46b, the radial oil grooves 45a and 45b, and the thrust needle bearing 34, into the second oil passage 41; and is returned from the lockup control valve 42 to the oil reservoir 43. In this process, the oil is supplied from the radial oil grooves 45a and 45b to the recess 28 in the one-way clutch 11, whereby the various portions of the one-way clutch 11 are lubricated.

Thus, in the clutch chamber 22, the pressure in the outer chamber portion 22b is higher than that in the inner chamber portion 22a due to the above-described flow of the working oil, so that the clutch piston 25 is urged in a direction away from the inner wall of the side cover 5 by a difference between these pressures, whereby the lockup clutch L is in the non-connecting state to permit the relative rotations between the pump impeller 2 and the turbine impeller 3. Therefore, when the pump impeller 2 is driven to rotate from the crankshaft 1, the working oil filling the circulation circuit 6 is circulated as shown by the arrow, whereby the rotational torque of the pump impeller 2 is transmitted to the turbine impeller 3 to drive the output shaft 10.

If a torque-amplifying action is provided between the pump impeller 2 and the turbine impeller 3 at this time, an associated reaction force provides a rotational force in the direction of the arrow A to the stator impeller 4, so that the outer race 15 is rotated in the direction of the arrow A relative to the inner race 16. However, the one-way clutch 11 is brought immediately into the connecting state by permitting the roller 20 to bite into between the outer peripheral surface of the inner race 16 and the wedge face 18a of the roller-receiving member 18. As a result, the stator impeller 4 is connected to the non-rotatable stator shaft 12 through the one-way clutch 11, whereby the rotation of the stator impeller 4 in the direction of the arrow A is inhibited.

When the torque-amplifying action is finished, the stator impeller 4 is rotated in the direction opposite from the arrow A along with the outer race 15 by the reversion of the direction of the torque received by the stator impeller 4. Therefore, the roller 20 is moved away from a position at which it bites into between the outer peripheral surface of the inner race 16 and the wedge face 18a of the roller-receiving member 18, whereby the one-way clutch 11 is brought into the disconnecting state, so that the stator impeller 4 is rotated in the same direction along with the pump impeller 2 and the turbine impeller 3.

When the torque converter T has been brought into such a coupling state, the lockup control valve 42 is switched over by the electronic control unit. As a result, the working oil discharged from the oil pump 21 flows in a direction opposite from the above-described direction from the lockup control valve 42 through the second oil passage 41 into the circulation circuit 6 to fill the circuit 6, and then flows to the inner chamber portion 22a of the clutch chamber 22 to also fill the inner chamber portion 22a. On the other hand, the outer chamber portion 22b of the clutch chamber 22 is opened to the oil reservoir 43 through the first oil passage 40 and the lockup control valve 42. Therefore, in the clutch chamber 22, the pressure in the inner chamber portion 22a is higher than that in the outer chamber portion 22b, so that the clutch piston 25 is urged toward the side cover 5 by a difference between these pressures. Thus, the friction lining 25a is brought into pressure contact with the inner wall of the side cover 5, whereby the lockup clutch L is brought into the connecting state. Then, the rotational torque transmitted from the crankshaft 1 to the pump impeller 2 is transmitted mechanically from the side cover 5 through the clutch piston 25 and the torque damper D to the turbine impeller 3. Therefore, the pump impeller 2 and the turbine impeller 3 are brought into directly connected states, whereby the torque output from the crankshaft 1 can be efficiently transmitted to the output shaft 10, leading to a reduction in fuel consumption.

In the one-way clutch 11 in the torque converter T, the outer race 15 is constructed by placing the hard roller-receiving member 18 having the wedge face 18a onto the roller-receiving member-fitted portion 28a of each of the plurality of recesses 28 formed in the inner periphery of the outer race body 17 made of a light alloy. Therefore, it is possible to achieve a great reduction in weight of the largest-diameter outer race body 17 in the one-way clutch 11, while ensuring the durability of the wedge face 18a contacting the roller 20, thereby contributing to a reduction in weight of the one-way clutch 11. When the outer race body 17 made of the light alloy is formed by casting integrally with and along with the light alloy stator impeller 4 of the torque converter T, it is possible not only to bring about a reduction in weight of the stator impeller 4, but also to reduce the number of parts and the number of assembling steps.

In the one-way clutch 11, a bearing face 17b for carrying the inner race 16 for rotation is formed on the inner periphery of the outer race body 17 between the adjacent recesses 28. Therefore, the accuracy of concentricity between the inner race 16 and the outer race 15 can be improved by an extremely simple arrangement in which the outer peripheral surface of the inner race 16 is carried on the bearing face 17b, so that the clutching action of the roller 20 to the wedge face 18a can be stabilized.

Moreover, since the wedge face 18a of the roller-receiving member 18 is formed as the concave curved surface, the pressure of contact between the roller 20 and the wedge face 18a can be minimized, whereby the durability of their contact portions can be improved.

Further, since the roller-receiving member 18 is formed into the cross-sectional shape symmetric with respect to the two axes X and Y perpendicular to each other, even if the roller-receiving member 18 is disposed in whatever manner at the roller-receiving-member fitted portion 28a of the recess 28, the wedge face 18a can be appropriately opposed to the roller 20, so that there is not a fear of erroneous assembling, leading to an improvement in assemblability. Especially, when the cross-sectional shape of the roller-receiving member 18 is the cocoon shape, it is possible to simultaneously satisfy a reduction in pressure of contact between the roller 20 and the wedge face 18a.

Further, the recess 28 is formed to open to the axially opposite end faces of the outer race body 17, and the transverse widths of the roller-receiving member 18 and the roller 20 are substantially equal to the transverse width of the recess 28. Therefore, the transverse widths of the roller-receiving member 18 and the roller 20 can be maximized in the one-way clutch, whereby the pressure of contact between them can be minimized, leading to a further improvement in durability of their contact portions.

The leaf spring 19 having the free end 19a for biasing the roller 20 in the direction to bite into the wedge face 18a, is clamped between the roller-receiving-member fitted portion 28a of the recess 28 and the roller-receiving member 18 fitted to the roller-receiving-member fitted portion 28a. Therefore, the roller-receiving member 18 also serves as a support member for supporting the leaf spring 19, whereby a special support member for supporting the leaf spring 19 is eliminated, so that the structure can be simplified. Moreover, in the assembling, the leaf spring 19 is merely fitted to the roller-receiving member-fitted portion 28a of the recess 28 together with the roller-receiving member 18, so that the leaf spring 19 can be mounted with a good attachability.

A second embodiment of the present invention shown in FIGS. 8 to 12 will now be described.

The second embodiment is different from the first embodiment in respect of structures of a roller-receiving member 118 and a spring 119.

As shown in FIGS. 8, 9, 10 and 12, a stopper face 118b, in addition to a wedge face 118a, is formed on an inner periphery of the roller-receiving member 118 fitted into the recess 28 of the outer race body 17. The stopper face 118b extends inclining radially inwards from a rear end of the wedge face 118a which is spaced at an increased distance apart from an outer peripheral surface of an inner race 16. The stopper face 118b is adapted to receive, at a predetermined location, the roller 20 moved to climb on the wedge face 118a by a centrifugal force, and retain the roller 20 at an non-operative position spaced apart from the inner peripheral surface of the inner race 16 (see a dashed line in FIG. 10), when the stator impeller 4 is rotated at a high speed in a direction opposite from an arrow A. Therefore, in the coupling state of the torque converter T in which the stator impeller 4 is rotated at the high speed in the direction opposite from the arrow A, the roller 20 is carried on the stopper face 118b, whereby the unnecessary contact between the roller 20 and the outer peripheral surface of the inner race 16 can be avoided, leading to an improvement in durability.

The recess 28 in the outer race body 17 has a spring-supporting face 28b displaced in the direction opposite from the arrow A along a circumferential direction of the inner race 16 from a roller-receiving member-fitted portion 28a. A spring 119 for biasing the roller 20 in a direction to bite into the wedge face 118a is mounted under compression between the spring-supporting face 28b and the roller 20.

Figure 10:
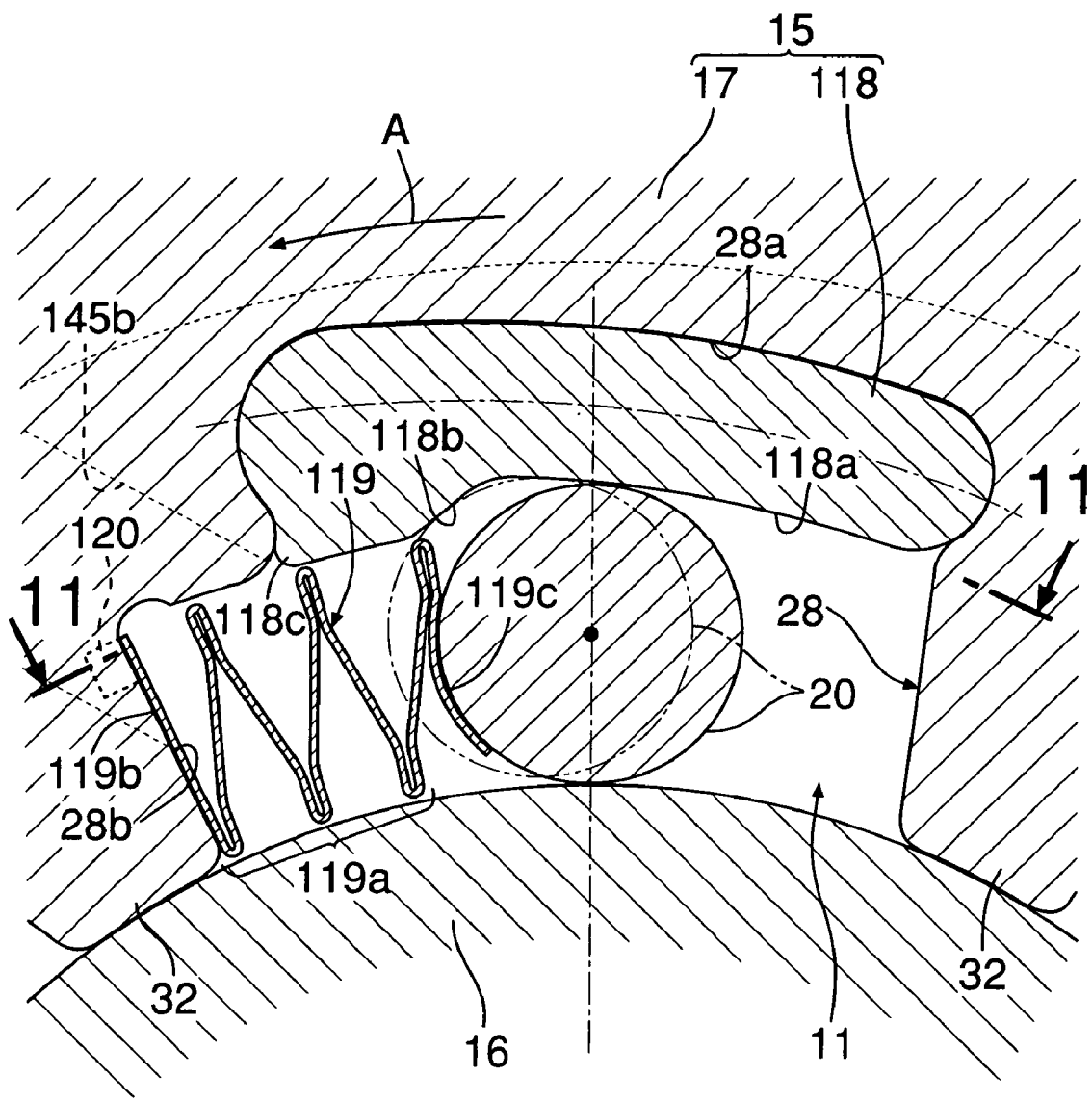
FIG. 10 is an enlarged sectional view of an essential portions of FIG. 9.
Figure 11:
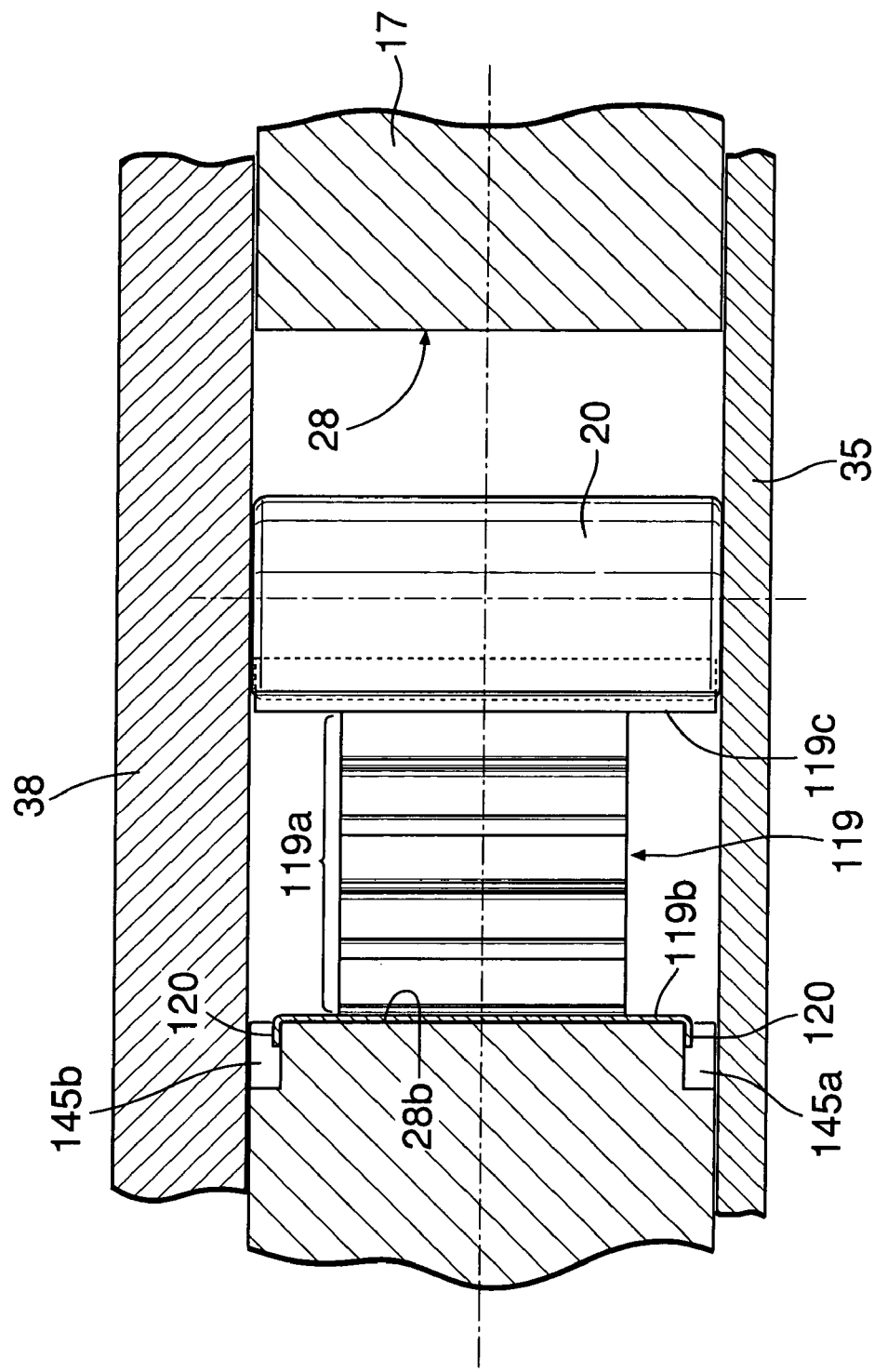
FIG. 11 is a sectional view taken along a line 11—11 in FIG. 10.
Figure 12:
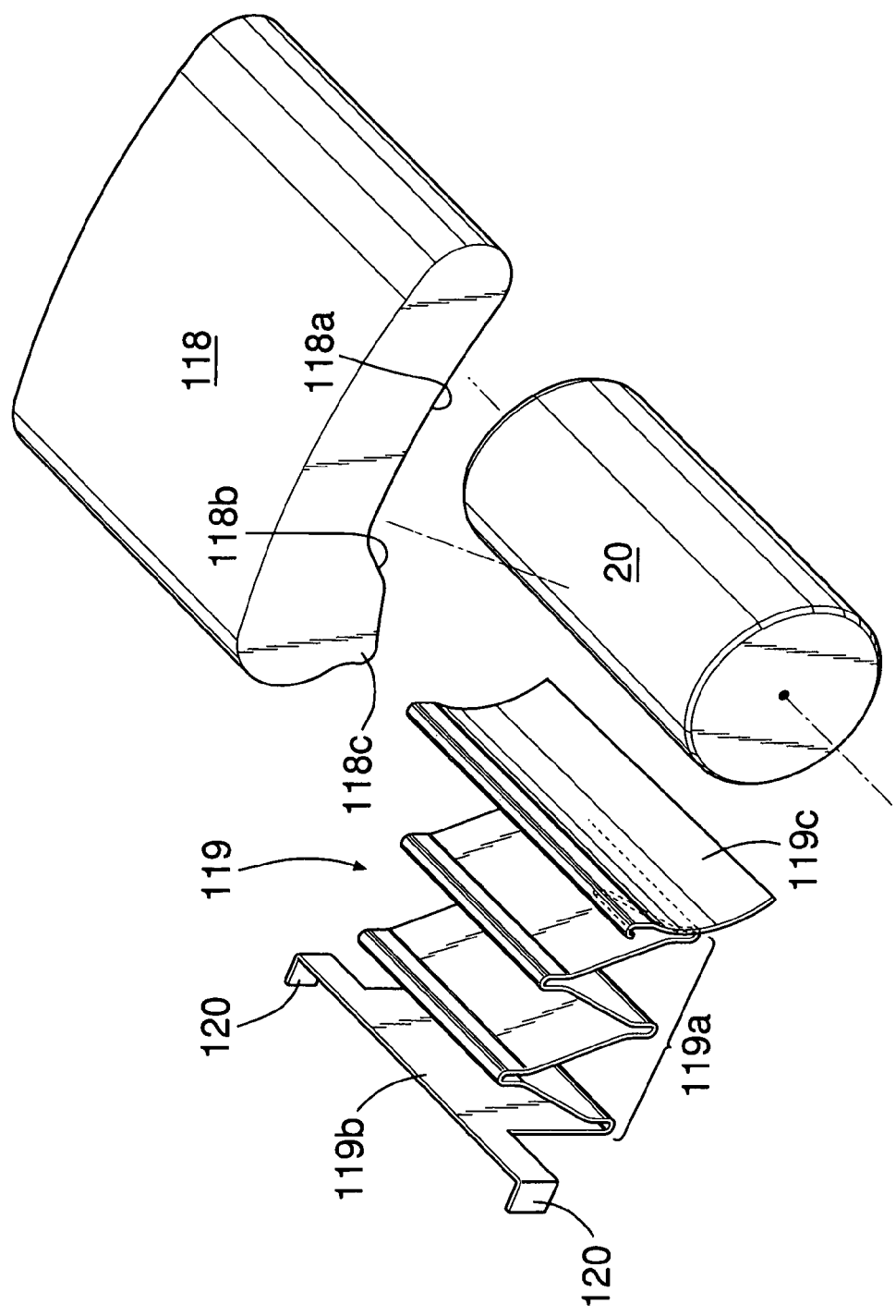
FIG. 12 is an exploded perspective view of an essential portion of the second embodiment.

As shown in FIGS. 10 to 12, the spring 119 is formed from a band-shaped spring steel plate and comprised of a leaf spring portion 119a bent in a zigzag manner, and first and second abutment ends 119b and 119c which are formed at one end and the other end of the leaf spring portion 119a and wider than the leaf spring portion 119a. A radius of approximately 180° is provided on each of a plurality of bent portions of the leaf spring portion 119a, to minimize a stress generated on each of the bent portions.

The spring 119 is disposed so that the plurality of bent portions of the leaf spring portion 119b face in radial directions of the outer race 15. A pair of projection pieces 120, 120 bent outwards are formed at opposite ends of the first abutment end 119a of the spring 119 abutting against the spring-supporting face 28b. The positioning projection pieces 120,120 are disposed so that they enter radially obliquely extending inclined oil grooves 145a and 145b which are formed in opposite sides of the outer race body 17, to permit each of the recesses 28 to communicate with annular oil groves 46a and 46b, whereby the outer race body 17 is sandwiched between the positioning projection pieces 120, 120. The second abutment end 119c of the spring 119 is formed into an arcuate shape to follow the peripheral surface of the roller 20 so that it can urge the roller 20 over its axial substantially entire width.

Thus, since the spring 119 is comprised of the zigzag-shaped leaf spring portion 119a and the first and second abutment ends 119b and 119c at the opposite ends of the leaf spring portion 119a, the relatively long roller 20 can be urged by the single spring with a good stability in the direction to bite into the wedge face 118a. Especially, since the second abutment end 119c is formed to abut against the roller 20 over its axial substantially entire width of the roller 20, it is possible to reliably prevent the inclination of the roller 20 to ensure a good clutch action.

Moreover, it is easy to provide a sufficiently small spring constant to the zigzag-shaped leaf spring portion 119a, so that the change in load of the spring 119 with the movement of the roller 20 can be suppressed to a small level, and when the torque converter T is coupled, the retraction of the roller 20 to the non-operative position by a centrifugal force can be accurately conducted.

In addition, since the pair of positioning projection pieces 120, 120 of the first abutment end 119b of the spring 119 enter the inclined oil grooves 145a and 145b to sandwich the outer race body 17 therebetween, the movement of the spring 119 in the axial direction of the outer race 15 is limited. Therefore, the state in which the spring 119 urges the roller 20 can be constant, whereby the turning-on/off operation of the one-way clutch 11 can be stabilized. In this case, the positioning projection pieces 120, 120 are formed to have a thickness smaller than the depth of the inclined oil grooves 145a and 145b, and disposed on bottoms of the oil grooves 145a and 145b, so that the positioning projection pieces 120, 120 do not obstruct the flowing of the oil in the inclined oil grooves 145a and 145b.

Referring again to FIG. 10, a projection 118c is integrally formed on the roller-receiving member 118 to cover an open end of the roller-receiving-member fitted portion 28a of the recess 28 closer to the spring 119. The projection 118c prevents the spring 119, particularly, the bent portion of the zigzag-shaped leaf spring portion 119a from entering a clearance between the roller-receiving-member fitted portion 28a and the roller-receiving member 118.

The arrangement of the other components is the same as that in the first embodiment, and hence portions or components corresponding to those in the first embodiment are designated by the same reference numerals and symbols in FIGS. 8 to 13.

Finally, a third embodiment of the present invention shown in FIGS. 13 to 15 will be described below.

The third embodiment is different from the second embodiment with respect of the structure and disposition of a spring 219.

The spring 219 is similar to the spring 119 in the second embodiment in that it comprises a zigzag-shaped leaf spring portion 219a, and first and second abutment ends 219b and 219c formed at opposite ends of the leaf spring portion 219a, but the spring 219 is disposed with bent portions of the leaf spring portion 219a facing axial directions of the outer race body 17. Positioning projection pieces 220 and 221 are formed at one ends of the first and second abutment ends 219b and 219c, respectively, to abut against the inner thrust plate 35 and the thrust plate 38 which are disposed on axially opposite sides of the outer race 15, so that the movement of the spring 219 in an axial direction of the outer race 15 is limited by the positioning projection pieces 220 and 221. In this case, the projection piece 220 on the spring-supporting face 28b may or may not enter the inclined oil groove 145a or 145b.

According to the third embodiment, since the bent portions of the zigzag-shaped leaf spring 219a of the spring 219 face the axial directions of the outer race body 17, it is possible to sufficiently increase the length between the oppositely facing bent portions of the leaf spring portion 219a, utilizing the recess 28 wide in the axial direction of the roller 20, to thereby sufficiently reduce the spring constant of the spring 219.

Figure 13:
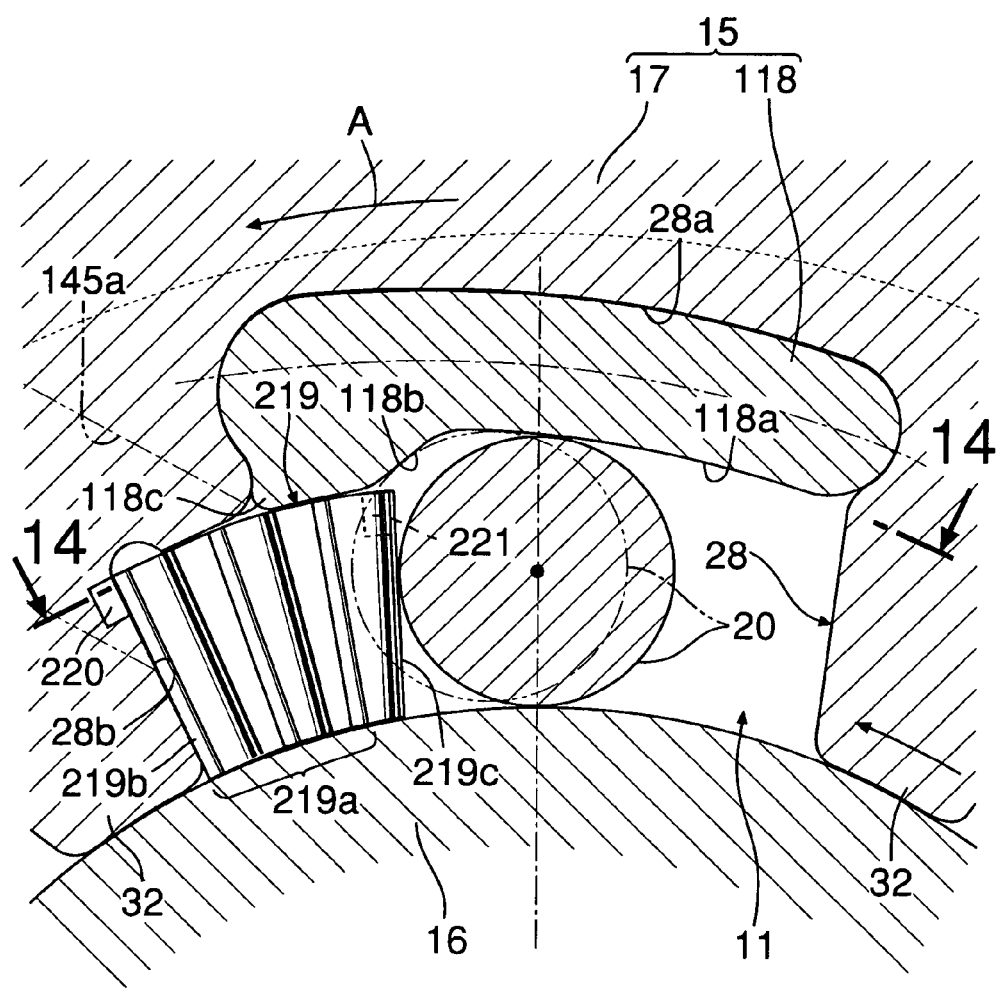
FIG. 13 is a view similar to FIG. 10, but showing a third embodiment of the present invention.
Figure 14:
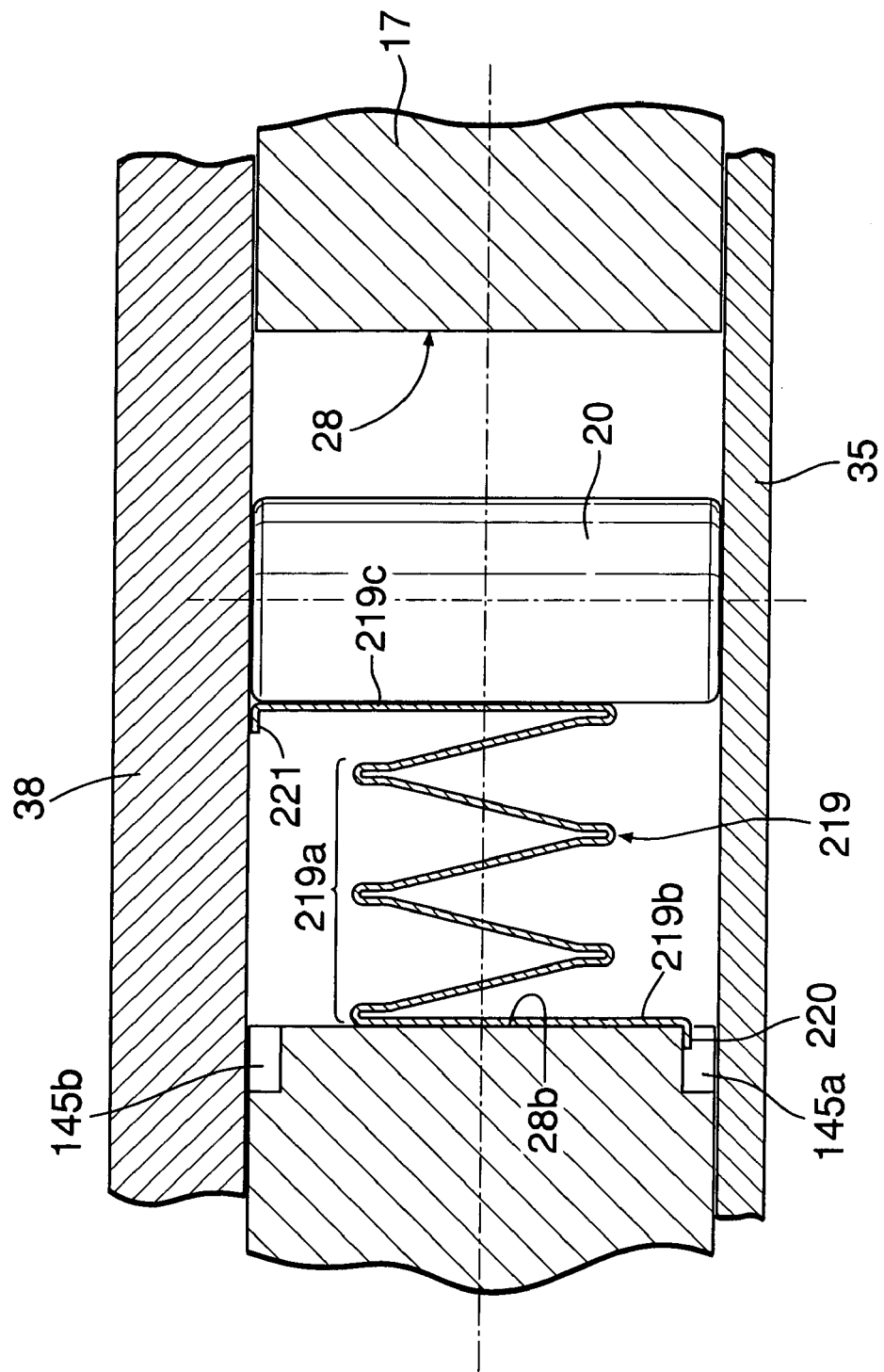
FIG. 14 is a sectional view taken along a line 14—14 in FIG. 13.

The arrangement of the components is the same as that in the second embodiment and hence, the portions or components corresponding to those in the second embodiment are designated by the same reference numerals and symbols in FIGS. 13 to 15, and the description of them is omitted.

The present invention is not limited to the above-described embodiments, and various modifications in design may be made without departing from the subject matter of the invention. For example, the one-way clutch 11 can be used also in transmitting devices other than the torque converter T.

What is claimed is:

1. A one-way clutch comprising:
an inner race; an outer race coaxially surrounding the inner race; a plurality of rollers inserted between an outer peripheral surface of the inner race and a plurality of wedge faces formed on the outer race so that the wedge faces are opposed to the outer peripheral surface of the inner race; and springs for biasing the rollers in directions to bite into the corresponding wedge faces,
characterized in that the outer race comprises an outer race body surrounding the inner race, and roller-receiving members which have the wedge faces and which are disposed on bottoms of a plurality of recesses formed in an inner periphery of the outer race body and harder than the outer race body, and
characterized in that the one-way clutch is in a torque converter provided with a lockup clutch and is formed with an oil passage structure therein which allows communication between the torque converter and one of a hydraulic pressure source and an oil reservoir, and a structure is provided on one of the inner race and the outer race body for determining an axial position of the inner race with respect to the outer race body.

2. A one-way clutch according to claim 1, characterized in that a bearing face for supporting the inner race for rotation is formed on the inner periphery of the outer race body between the adjacent recesses.

3. A one-way clutch according to claim 1, characterized in that each of the recesses is formed to open to axially opposite end faces of the outer race body, and transverse widths of the roller-receiving member and the roller are set to be substantially equal to a transverse width of the recess.

4. A one-way clutch according to claim 1, characterized in that the spring is comprised of a zigzag-shaped leaf spring portion, a first abutment end connected to one end of the leaf spring portion to abut against a spring-supporting face of an inner wall of the recess, and a second abutment end connected to the other end of the leaf spring portion to abut against the roller, and the roller is biased in a direction to bite into the wedge face by a resilient force of the leaf spring portion.

5. A one-way clutch according to claim 4, characterized in that the second abutment end is formed to abut against the roller over its axial substantially entire width.

6. A one-way clutch according to claim 1, wherein said structure comprises a first thrust plate mounted on said outer race body and a wall provided on the outer race body, said first thrust plate and said wall being positioned to face axially opposite end portions of the inner face from outer sides.

7. A one-way clutch according to claim 6, wherein a second thrust plate is mounted on said outer race body on the same axial side as where said wall is provided, said first and second thrust plates extending radially inwardly so as to prevent falling off of the rollers and the roller-receiving members from axially open ends of said recesses.

8. A one-way clutch according to claim 7, wherein stop rings are mounted on the outer race body for retaining said first and second thrust plates on said outer race body.

9. A one-way clutch according to claim 8, wherein said first and second thrust plates are mounted on the outer race body against relative rotation with respect to the outer race body around an axis.

10. A one-way clutch according to claim 7, wherein said first and second thrust plates are mounted on the outer race body against relative rotation with respect to the outer race body around an axis.

11. A one-way clutch comprising:
an inner race; an outer race coaxially surrounding the inner race; a plurality of rollers inserted between an outer peripheral surface of the inner race and a plurality of wedge faces formed on the outer race so that they are opposed to the outer peripheral surface of the inner race; and springs for biasing the rollers in directions to bite into the corresponding wedge faces,
characterized in that the outer race comprises an outer race body surrounding the inner race, and roller-receiving members which have the wedge faces and which are disposed on bottoms of a plurality of recesses formed in an inner periphery of the outer race body and harder than the outer race body,
characterized in that each of the wedge faces of the roller-receiving members is formed as a concave curved face.

12. A one-way clutch comprising:
an inner race; an outer race coaxially surrounding the inner race; a plurality of rollers inserted between an outer peripheral surface of the inner race and a plurality of wedge faces formed on the outer race so that they are opposed to the outer peripheral surface of the inner race; and springs for biasing the rollers in directions to bite into the corresponding wedge faces, characterized in that the outer race comprises an outer race body surrounding the inner race, and roller-receiving members which have the wedge faces and which are disposed on bottoms of a plurality of recesses formed in an inner periphery of the outer race body and harder than the outer race body,
characterized in that each of the roller-receiving members is formed so that its cross-sectional shape is symmetric with respect to two axes (X, Y) perpendicular to each other.

13. A one-way clutch comprising:
an inner race; an outer race coaxially surrounding the inner race; a plurality of rollers inserted between an outer peripheral surface of the inner race and a plurality of wedge faces formed on the outer race so that they are opposed to the outer peripheral surface of the inner race; and springs for biasing the rollers in directions to bite into the corresponding wedge faces, characterized in that the outer race comprises an outer race body surrounding the inner race, and roller-receiving members which have the wedge faces and which are disposed on bottoms of a plurality of recesses formed in an inner periphery of the outer race body and harder than the outer race body,
characterized in that each of the springs is comprised of a leaf spring clamped between the bottom of each of the recesses and each of the roller-receiving members, the leaf spring being provided with a free end for biasing the roller in a direction to bite into the wedge face.

14. A one-way clutch comprising:
an inner race;
an outer race coaxially surrounding the inner race;
a plurality of rollers inserted between an outer peripheral surface of the inner race and a plurality of wedge faces formed on the outer race so that they are opposed to the outer peripheral surface of the inner race; and
springs for biasing the rollers in directions to bite into the corresponding wedge faces,
characterized in that the outer race comprises an outer race body surrounding the inner race, the inner race extending axially through the outer race body substantially, and roller-receiving members which have the wedge faces and which are disposed on bottoms of a plurality of recesses formed in an inner periphery of the outer race body and harder than the outer race body, and characterized in that the inner race is coupled to a stator shaft of a torque converter, and the outer race body is formed integrally on a stator hub made of a light alloy in the torque converter.

15. A one-way clutch comprising:

an inner race;

an outer race coaxially surrounding the inner race;

a plurality of rollers inserted between an outer peripheral surface of the inner race and a plurality of wedge faces formed on the outer race so that they are opposed to the outer peripheral surface of the inner race; and springs for biasing the rollers in directions to bite into the corresponding wedge faces, characterized in that the outer race comprises an outer race body surrounding the inner race, and roller-receiving members which have the wedge faces and which are disposed on bottoms of a plurality of recesses formed in an inner periphery of the outer race body and harder than the outer race body, characterized in that the inner race is coupled to a stator shaft of a torque converter, and the outer race body is formed integrally on a stator hub made of a light alloy in the torque converter, and characterized in that each of the roller-receiving members has a stopper face adapted to receive the roller when the roller is moved to climb on the wedge face in a direction away from the outer peripheral surface of the inner race by a centrifugal force.

\* \* \* \* \*